United States Patent
Nair et al.

(10) Patent No.: US 8,325,625 B2
(45) Date of Patent: Dec. 4, 2012

(54) METHOD AND SYSTEM FOR AUTOMATIC DATA TRANSFER ON A NETWORK-CONNECTED DEVICE

(75) Inventors: Biju Nair, Buffalo, IL (US); Robert Boxall, Elmhurst, IL (US); Chris Heistad, Cedar Falls, IA (US); Vojislav Samsalovic, Chicago, IL (US)

(73) Assignee: Smith Micro Software, Inc., Aliso Viejo, CA (US)

( * ) Notice: Subject to any disclaimer, the term of this patent is extended or adjusted under 35 U.S.C. 154(b) by 1588 days.

(21) Appl. No.: 11/088,500

(22) Filed: Mar. 23, 2005

(65) Prior Publication Data

US 2006/0047830 A1   Mar. 2, 2006

Related U.S. Application Data

(60) Provisional application No. 60/555,812, filed on Mar. 23, 2004, provisional application No. 60/555,988, filed on Mar. 23, 2004.

(51) Int. Cl.
*H04L 12/28* (2006.01)
*G06F 15/177* (2006.01)
*G06F 15/16* (2006.01)

(52) U.S. Cl. ........ 370/254; 370/466; 709/228; 709/229; 726/3

(58) Field of Classification Search .................. 370/464, 370/466, 355, 238, 328, 395.2–395.3, 400; 709/223–232, 238, 242, 217–218, 220; 726/1–21, 726/26; 455/452.2
See application file for complete search history.

(56) References Cited

U.S. PATENT DOCUMENTS

| | | | |
|---|---|---|---|
| 6,832,259 B2 * | 12/2004 | Hymel et al. | 709/229 |
| 6,910,072 B2 | 6/2005 | Macleod Beck et al. | |
| 7,159,031 B1 * | 1/2007 | Larkin et al. | 709/238 |
| 7,185,360 B1 * | 2/2007 | Anton et al. | 726/3 |
| 2003/0208602 A1 * | 11/2003 | Bhalla et al. | 709/227 |
| 2005/0177515 A1 * | 8/2005 | Kalavade et al. | 705/52 |

OTHER PUBLICATIONS

International Search Report—PCT/US05/09535.

* cited by examiner

*Primary Examiner* — Habte Mered
(74) *Attorney, Agent, or Firm* — Craig M. Stainbrook; Stainbrook & Stainbrook, LLP

(57) ABSTRACT

A service provider interface protocol, when embedded into a network-capable device, can automatically connect the device to a wired or wireless network. This automatic device connectivity can include automatic logging on, automatic authentication and seamless, automatic data upload to, or download from, another location on the network. Configuration parameters for the automatic authentication, upload and download locations and other related device configurations can be stored within the network server-side management system.

13 Claims, 5 Drawing Sheets

METHOD AND SYSTEM FOR AUTOMATIC DATA TRANSFER ON A NETWORK-CONNECTED DEVICE

CROSS-REFERENCE TO RELATED APPLICATIONS

This application claims the benefit of U.S. Provisional Application No. 60/555,812, filed Mar. 23, 2004 entitled "Service Level Assurance System and Method for Wired and Wireless Broadband Networks" and U.S. Provisional Application No. 60/555,988, filed Mar. 23, 2004 (entitled "Method and System for Automatic Data Transfer on a Network-Connected Device", both of which are incorporated herein by reference in their entirety and for all purposes.

The present application is related to U.S. Provisional Application No. 60/504,152, filed Sep. 19, 2003 and entitled "Automated Updating System for Wireless Networks" commonly owned by the present assignee, which is incorporated herein by reference in its entirety and for all purposes.

BACKGROUND OF THE INVENTION

1.. Field of the Invention

Generally, the present invention relates to the connected devices in a network. More specifically, the present invention relates to the transfer of data between and among the devices and servers on the network.

2.. Description of the Related Art

There are many devices capable of connecting to a data network, be it wired or wireless. These devices can be as sophisticated as a supercomputer or satellite, or as simple as a household appliance, such as a refrigerator with a microcontroller installed. Other such devices can include digital cameras (video & still), cell phones, MP3 players, PDAs, notebook computers and even wrist watches. These network capable devices are gaining enormous popularity. While these devices offer tremendous networking flexibility and possibility in their respective usage, a severe restriction in them, because of their small size, is their storage capacity.

For example, as the amount of data in one digital photo increases, the number of digital images capable of being stored on a particular internal storage media decreases. Thus, it is necessary for the digital camera enthusiast to frequently download the locally-stored digital images to external storage media. Similarly, in an MP3 player, there is finite internal memory for a listener to store digital music files. Thus, as the internal memory becomes full, the listener must offload unwanted music files to make storage room for uploading additional music files. Also, camera cell phones of today have limited resolution and very limited storage capacity.

The typical device, such as a PDA, that requires regular data transferences can perform these data up/down loads in several ways. The internal memory of the device, such as a removable memory card, can be removed and inserted into the network into which the data are destined. Alternatively, the device can be directly connected into the network, either via a wired connection or a wireless connection. This alternative, or direct connection, typically requires extensive and complex setup and configuration.

Therefore, what is needed is a system and method for connecting devices to a network for data transference that allows for device auto-configuration, data transfer and network management with little or no user interaction.

SUMMARY OF THE INVENTION

A service provider interface protocol, when embedded into a network-capable device, can automatically connect the device to a wired or wireless network. This automatic device connectivity can include automatic logging on, automatic authentication and seamless, automatic data upload to, or download from, another location on the network.

Configuration parameters for the client-side automatic authentication, upload and download locations and other related device configurations can be stored within the network server-side management system.

BRIEF DESCRIPTION OF THE DRAWINGS

These and other aspects and features of the present invention will become apparent to those ordinarily skilled in the art upon review of the following description of specific embodiments of the invention in conjunction with the accompanying figures, wherein.

DETAILED DESCRIPTION OF THE INVENTION

The present invention will now be described in detail with reference to the drawings, which are provided as illustrative examples of the invention so as to enable those skilled in the art to practice the invention. Notably, the figures and examples below are not meant to limit the scope of the present invention. Where certain elements of the present invention can be partially or fully implemented using known components, only those portions of such known components that are necessary for an understanding of the present invention will be described, and detailed descriptions of other portions of such known components will be omitted so as not to obscure the invention. Further, the present invention encompasses present and future known equivalents to the components referred to herein by way of illustration.

In describing embodiments and aspects of the present invention, specific examples of network-capable devices are provided, such as digital cameras, PDAs and laptops. The present invention is not intended to be limited to such specific examples of devices or connected devices. Rather, it will be readily understood by those skilled in the art after reading this disclosure that any device, machine, appliance, etc. that is capable of any type of network connection, be it wired or wireless, can be used in connection with the present invention. Further, throughout this disclosure a network is meant to be any wired (e.g., plain old telephone lines, fiber optic cable, etc.) or wireless (e.g., microwave, laser light, radio frequency, etc.) data transfer network to which any of the devices may be connected or interconnected.

Figure 1:
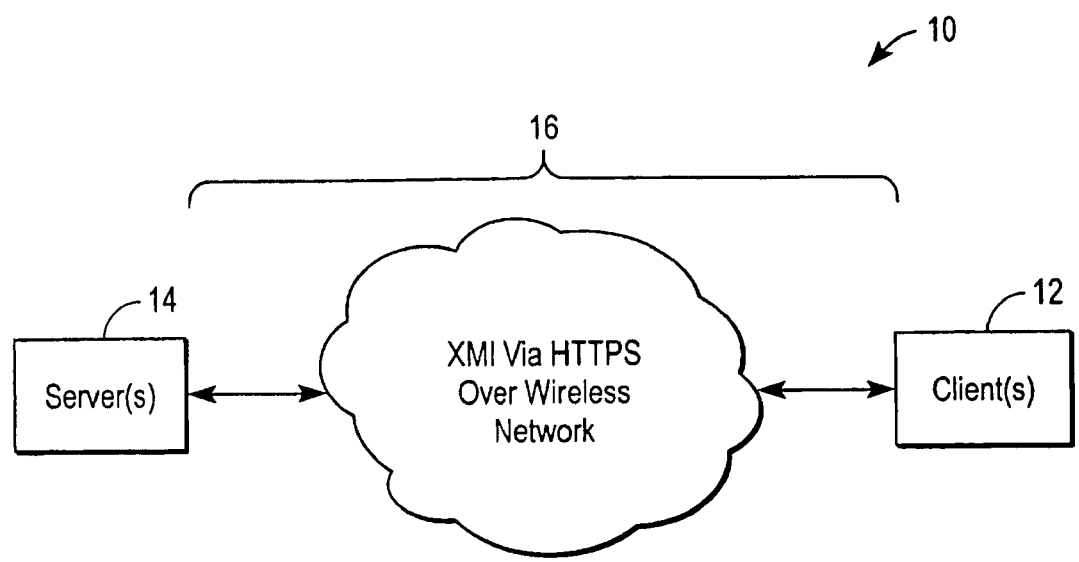
FIG. 1 illustrates an exemplary wireless client-server environment in which the present invention can used.

FIG. 1 illustrates an exemplary wireless client-server environment in which the present invention can used. As shown, one or more clients or client devices 12 can be networked to one or more servers 14 via a network 16, wherein the network 16 can include wired or wireless network connections. The wireless network can, for example, use a Bluetooth, IEEE 802.11 or CDMA connection, using XML and/or HTTPS for data transfer.

According to embodiments of the present invention, the device 12 includes and is embedded with a service provider interface (SPI) protocol. Thus, the device 12 becomes an SPI-enable device that is capable of automatically connecting the device 12 to a wireless network, such as a carrier's WiFi hot spot location. This automatic connectivity can include logging on, automatic authentication and seamless data upload to, or download from, another location on the network 16, for example, a connected server, such as the server 14. Once the device 12 is connected to the network 16, data can be transferred between the device 12 and the server 14 that includes a storage medium (not shown) or any other storage medium in communication with the network 16. This capability relieves the end user the device 12 from having to carry a separate storage device (e.g., a laptop, external hard drive, etc.) with them for the sole purpose of storing excess data. Further, this capability relieves the end user of the burdensome configuration and maintenance of multiple network connectivity options.

In the case of mobile computing using a wireless networks, it is widely expected that most WiFi, WiMax and WWAN carriers or operators will, in the future, decide on a client-server based Network Management System (NMS), that allow their users to automatically discover the carrier's networks in public locations, connect to them and automatically log them onto these networks. The system according to certain embodiments of the present invention describes the next generation of such a client-server system. The networks and devices use a common protocol, allowing the devices 12 to recognize the networks 16, connect to them, log a valid user onto the system and perform certain actions, such as upload or download data, redirect communication to certain websites, etc., all automatically and transparently from the user's perspective.

Network Management System (NMS)

Figure 2:
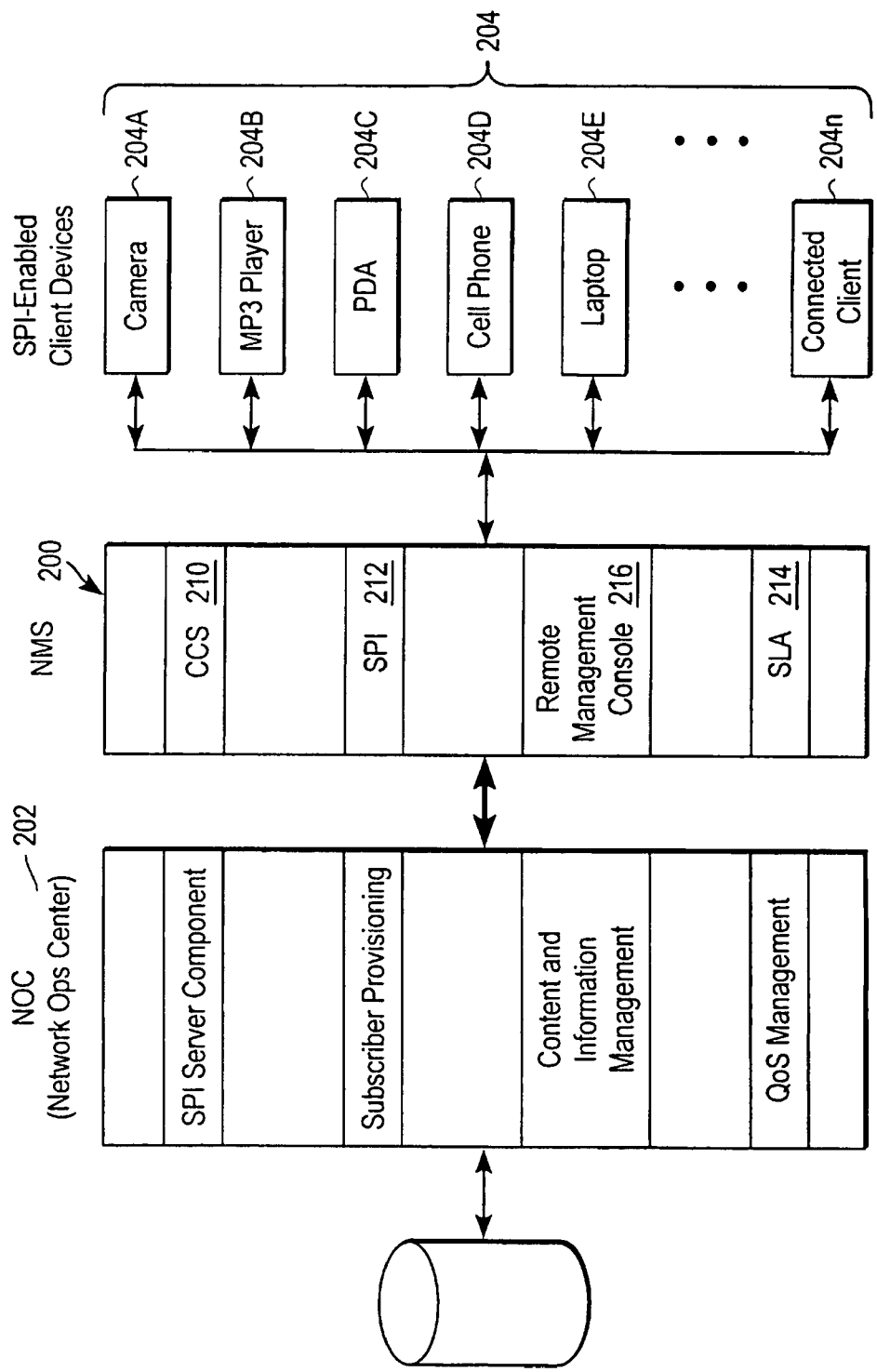
FIG. 2 illustrates a high level architecture of the Network Management System (NMS) according to an embodiment of the present invention.

Referring now to FIG. 2 a high level architecture of a Network Management System (NMS) 200 is shown. The NMS 200 allows carriers to manage large number of devices connected to their networks (i.e., the connected devices). As shown, the NMS 200 is connected as the go-between for the carriers Network Operations Center (NOC) 202 and the individual devices 204 enabled with a service provider interface (SPI). The devices 204 that include the SPI functionality are also referred to as SPI-enabled devices. The NOC 202 can be further attached to one or more servers and can provide numerous server-side functions. These server-side functions can include, for example, the SPI server-side component, the network subscriber provisioning, the carrier's quality of service (QoS) management and the general content and information management. Although, additional server-side functionality can also be provided.

In one embodiment, configuration parameters for automatic authentication, upload and download locations and other related device configurations are stored within the NMS 200. The NMS 200 provides this information to the connected devices 204 based, at least in part, on the information the device 204 sends to the NMS 200 using the SPI protocol. For example, a connected device 204 can send its serial number, current IP address, location (hotspot ID), available storage memory, network connection speed, battery level, etc. to the NMS 200. Based on that information, for example, the NMS 200 can then retrieve the user's profile and send appropriate instructions back to the device. For example, if a user has defined a custom URL for image uploads, the NMS 200 can instruct the device to automatically upload the locally-stored images on the device to that pre-defined location. The NMS 200 can also specify that these actions should be only executed if network connection speed is sufficient and battery level is satisfactory. Also, the NMS 200 might decide not to instruct the device 204 to download the data, if the available memory of the device 204 is not sufficient.

Configuration parameters and actions provided by the NMS 200 can be also cached on the device 204, if persistent storage is available. In a normal mode of operation, for example, the device 204 might always try to communicate with the NMS 200 to obtain specific instructions. However, the NMS 200 can instruct the device 204 to store configurations/actions locally to be able to use them if the NMS 200 is temporary unavailable.

As further shown in FIG. 2, the exemplary NMS 200 includes four basic components, each one with a distinct set of responsibilities and discussed in further detail below, however working very much in tandem with each other to facilitate the complete functionality of the NMS 200. The NMS 200 includes a central configuration server (CCS) 210, a service provider interface (SPI) 212, service level assurance (SLA) 214, and a remote management console (RMC) 216. These components have the basic responsibility of interfacing with a specific part of the carrier's NOC 202, however, from time to time they do interface with other parts within the NOC 202 as well.

Finally, as shown in FIG. 2, the SPI-enabled devices 204 connect through the NMS 200 to access content and information on the server-side of the network. This aspect will be discussed in more detail below.

CCS Description

Figure 3:
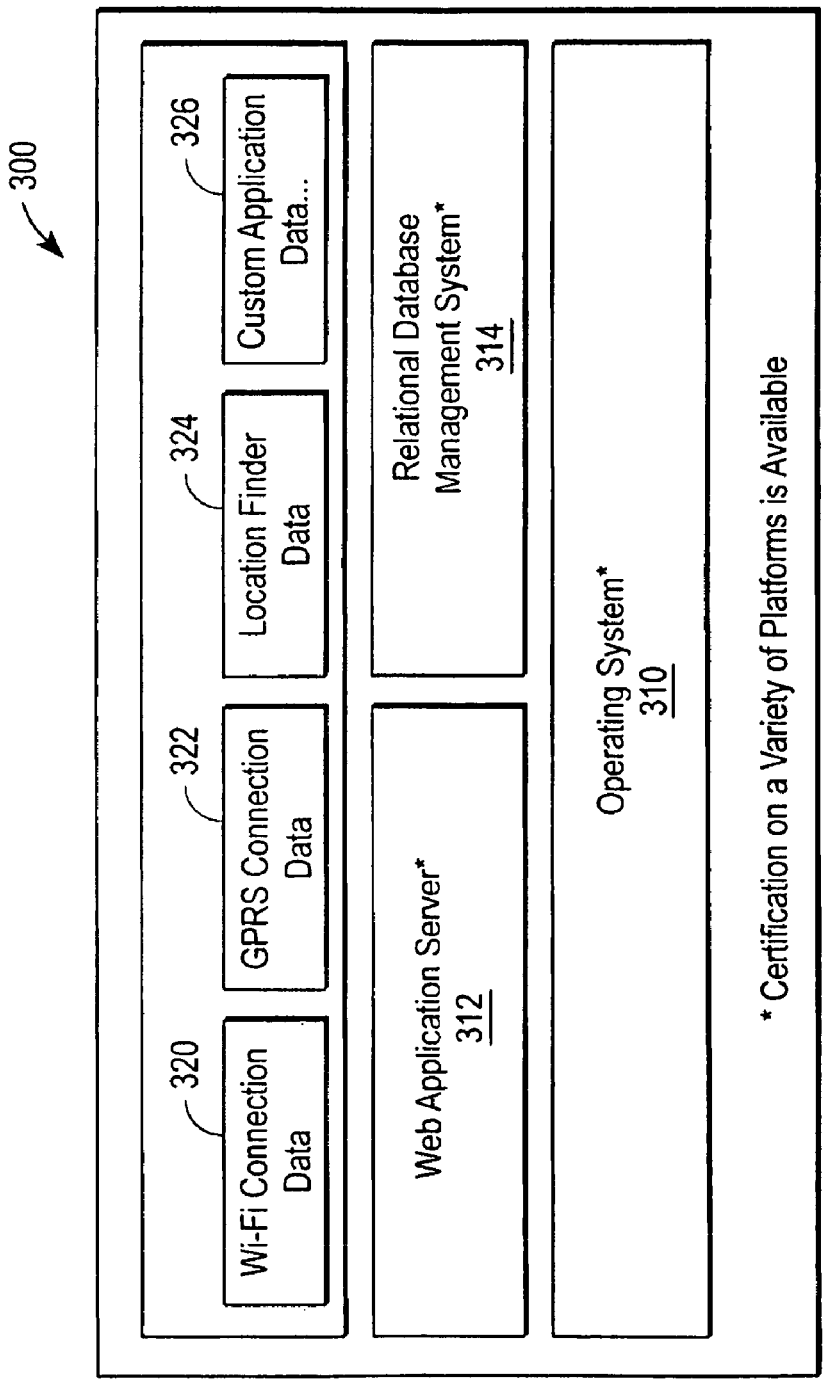
FIG. 3 illustrates an exemplary central configuration server (CCS) according to an embodiment of the present invention.

Referring now to FIG. 3, a central configuration server (CCS) 300 is shown according to an embodiment of the present invention. The CCS 300 allows carriers, PC-OEMs, and Enterprises to manage the storage and flow of updates and upgrades to clients from a single location. The CCS 300 operates to provide version control, code management, and flow control for all updateable features within the Roaming Client software. In addition, the CCS 300 allows management and manipulation of "hotspot" location database information, roaming partner database information, and the gated upload capabilities for these databases. The CCS 300 also allows the carrier, PCOEM, or Enterprise to manage versioned software files, such as executable files of the Roaming Client application and user interface skins.

The CCS 300 can be used in conjunction with the Roaming Client to update other files on the device, such as a PC, that are not directly related to the roaming client application, such as device drivers. The CCS 300 also negotiates download parameters, such as bandwidth, frequency, and duration of downloads with each client, based on rules that are predetermined by the carrier, PCOEM, Enterprise, or configured by the end user. Stated slightly differently, the CCS 300 may be thought of as a secure, web-based administrative console, which provides the capability for updating the various pre-defined and provider-specific parameters for the Roaming Client. In addition, the CCS 300 allows management and manipulation of "hotspot" location database information, roaming partner database information, and the gated upload capabilities for these databases. Together, the combination of the CCS 300 with the user connectivity tool of the Roaming Client provides a dynamic wireless access management solution.

In an exemplary implementation, the CCS 300 may be architected based on the J2EE framework. In at least such an implementation, the CCS 300 need not use a middle tier or business tier, and therefore need not include an Enterprise Java Beans server. The CCS 300 functionality may reside on a personal computer or a Sun SPARC workstation, or similar computing platform, and any suitable operating system such as Windows, Linux or Solaris. Typical software requirements for such an exemplary arrangement include compatibility with a Java Servelet specification, for example version 2.3, and a JSP application such as version 1.2, as well as with a suitable database server, for example Microsoft SQL Server 2000 or similar. Typical software requirements for such an exemplary arrangement include compatibility with Java Servlet Specification 2.3 or later and Java Server Pages Specification 1.2 or later, as well as with a suitable SQL92 (or later) compliant database server, for example Microsoft SQL Server 2000, Oracle 9i, Postgresql 7.3 and so on.

Referring again to FIG. 3, the CCS 300 architecture includes an operating system layer 310, which communicates with selected operating systems, which in one embodiment is the Windows 2000 Advanced Server. An application server 312, shown in the illustrated example as J2EE-based and certified on Jakarta Tomcat, layers atop the OS layer 310, as does a database module 314, which in the illustrated example is compliant with SQL 2000 and certified on MS SQL Server. Layered atop the application server module 312 and database module 314 are various modules for managing connections via different protocols. Thus, the CCS 300 includes a Wi-Fi connection data management module 320, GPRS connection data management module 322, a Location Finder data management module 324, and a Custom Application data management module 326.

SPI Description

Figure 4A:
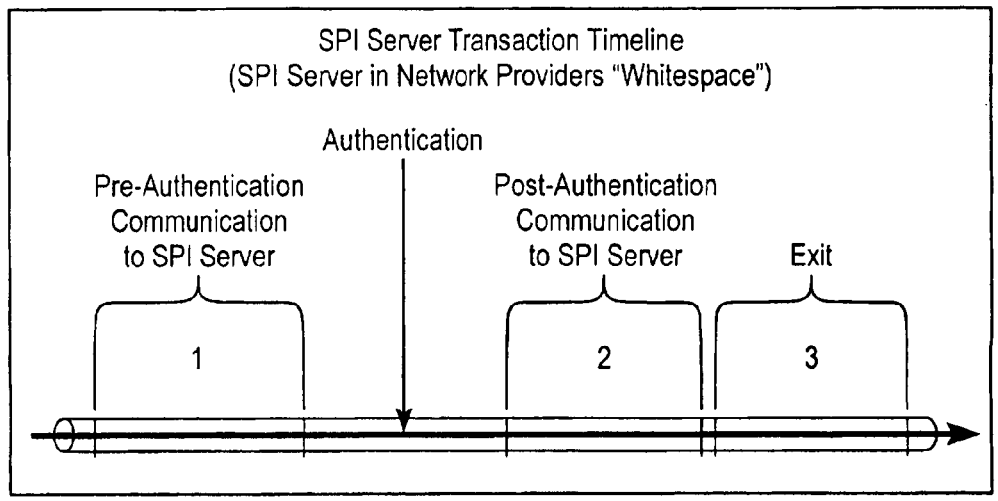
FIGS. 4A and 4B illustrate an exemplary service provider interface (SPI) according to an embodiment of the present invention.
Figure 4B:
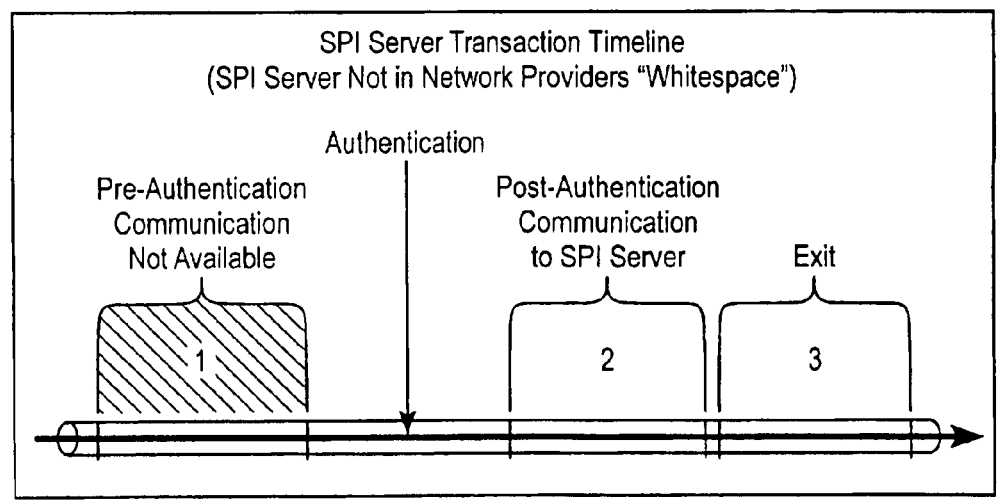

Referring now to FIGS. 4A and 4B and FIG. 1, operation of the SPI 212 can be better appreciated. To put this aspect in context, a brief discussion of WiFi Hotspots is helpful. In the case of WiFi Hotspot deployments, a service provider typically has hundreds if not thousands of different locations that a user can use connect to the service provider's network. These locations may be maintained by the service provider or provided by a roaming agreement with another provider. In one typical scenario, a user arrives at a location, connects to the network and then launches their WEB browser. The user attempts to get to the Internet, but is then captured and redirected by the local Network Authentication Server (NAS), whereupon the user is requested to authenticate or sign up and pay for service.

In the case of the Roaming Client, the SPI protocol allows additional steps to be performed. The basic goal of the SPI protocol is to allow the Roaming Client the ability to communicate to the service provider before and after login into a local hotspot. This client/server communication allows a service provider to perform various checks on the client, and push back different actions for the client to execute depending on the Roaming Clients state.

The SPI 212 provides a client/server communications protocol, and can be implemented on any web server that supports such a protocol. The SPI protocol allows a trusted web server to execute actions on the devices 204. In an exemplary arrangement, the SPI protocol may, for example, be an XML-based messaging protocol that uses HTTPS as the primary transport for secure communications between the client and server. The SPI 212 and the CCS 300 (FIG. 3) interact in that the CCS 300 is the mechanism that allows a provider to modify specific parameters on the client, while the SPI protocol is the mechanism that allows specific actions to be executed on the client, for example, login and authentication in some embodiments. Such actions may use parameters that are pushed to the client via the CCS 300 interface.

The operation of the SPI 212 can be better appreciated from the procedure for login and authentication, which is illustrated in FIGS. 4A-4B. In this example, a provider deploys a hotspot and deploys a server that supports the SPI protocol. A user associates with the hotspot and physically establishes a connection between the client machine, which is any one of the devices 204, and the hotspot. In Wi-Fi there is a notion of physical "connection" to a hotspot although the user has not been authenticated. In this case the Roaming Client is considered to be in the "connected" state although not yet authenticated. At this point, the Roaming Client can initiate communication to the provider's SPI server to inform the server about its current state and other attributes associated with the client.

As shown in FIG. 4A, the Roaming Client will only initiate SPI transactions to servers that are considered "trusted," or in the providers "White List." This will allow the provider to send back to the client machine or device 204 pre-authentication actions to be executed. After authentication, the client machine will again post its INFO status to the SPI server, allowing post-authentication actions to be executed by the client machine. Finally, when the client machine disconnects final messages can be executed related to disconnection from the network. Examples of pre-authentication actions that a client machine may execute using the SPI 212 include, but are not limited to, provisioning a new user, pushing surcharge information to a client, requesting statistics from the client, and prompting a user for a password. Post-authentication actions can include pushing the time remaining, pushing advertising, pushing a custom skin and pushing a message. Examples of disconnect actions includes sending log-off data, such as a thank you or other message, and sending usage statistics. It will be appreciated that such actions can be provided to the NOC in accordance with the present invention to provide dynamic monitoring and data gathering.

However, if the server is not in the network provider's "White List," as illustrated in FIG. 4B, no actions can be executed by the SPI server until the client machine has been authenticated to the network, but all appropriate actions can be taken once the client machine has authenticated.

SLA Description

When an SPI-enabled device contacts the SLA module (for example the SLA 214 of FIG. 2), the SLA module queries, via the SPI and CCS, the appropriate SPI enabled devices 204A-n, which in turn respond to the queries and provides appropriate information concerning location, connect attempts, failures, signal strength, available and effective data rates, and any other status or location information that the service provider or carrier deems appropriate to query and collect.

Remote Management Console Description

This component, for example, can allow a network administrator to remotely administer the NMS. Administrators of the NOC can securely login (https) through a web interface and administer the system.

In operation, using embodiments of the present invention, SPI-enabled network devices such as digital cameras, camera cell phones, MP3 players, MPEG players and the like are treated no differently by the NMS than computing devices, such as laptops and PDAs.

Figure 5:
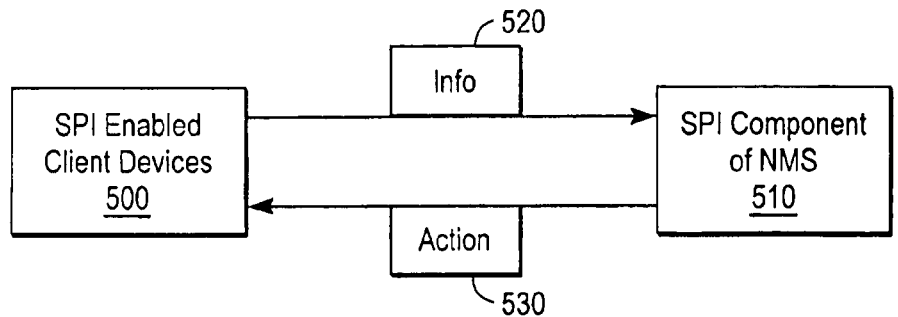
FIG. 5 illustrates a simple "Event-Reaction" paradigm of the exchange between an SPI-enabled device and the NMS according to an embodiment of the present invention.

Referring now to FIG. 5, a simple "event-reaction" paradigm of the exchange between an SPI-enabled client device 500 and a NMS 510 according to an embodiment of the present invention is illustrated. In such an exchange, the data sent from the SPI-enabled client device 500 to the NMS 510 is information 520 and the data sent from the NMS 510 to the SPI-enabled client device 500 is an action 530.

A device can be SPI-enabled prior to that device being used in an automated system for uploading data. With such a client device, for example, this means that an authentication API and the SPI can be ported to work on the operating platform of the devices. The authentication API is capable of supporting one of the many popular authentication mechanism deployed by the Wireless industry today, such as WISPr. Once implemented in the client, these devices, upon detection of a carrier's network, are capable of automatically connecting and authenticating against the network.

Further, by enabling the client device to recognize the SPI protocol, the carrier's NMS is able to direct the client device to perform certain actions, and vice versa. The entire interaction is based, for example, on an "event-reaction" paradigm. An SPI-enabled client device is capable of communicating to the SPI server component a variety of information such as its location, account status, user name, password and the like. The SPI protocol can be, for example, an XML based protocol that is used for communication between client device and servers. However, WML or other such languages can be used. The SPI server, which can be located in the carrier's NMS, receives the client device information, reverts the relevant information to the carrier's NOC and based on individual information directs the client to perform certain actions (e.g., if the user has a valid username and password, then the device is logged onto the network automatically). In one aspect of this embodiment, if the user is a first time user on the carrier's network, for example, then the SPI server can send a message to the device informing the user that an account should be established before accessing the carrier's network. Such a message can further provide a customer service telephone number, URL or the like for the first-time user to use for initiating the account.

Once the user is authenticated on the system, the SPI and the connected device can send requests to each other; such as "Upload" or "Download" a particular file to a particular location. In this case, the NMS would start to upload/download the content, such as JPEG pictures or MP3 audio content. In one aspect of this embodiment, the user can pre-assign server-side storage locations to be used for uploading or downloading data. Once this data transfer is complete, the device can automatically logout and disconnect from the server. Such an automatic log-out process can be initiated either by the device itself or the server-side SPI.

In a further embodiment, the SPI protocol itself, as well as the NMS components, can be designed in such a way that the entire interaction between the SPI-enabled client devices, the NMS and the carrier NOC happens without requiring any user intervention or interaction. The SPI and the authentication API components can embed the intelligence required to communicate with the NMS into the previously "static," or user interaction intensive, devices.

Aspects of the present invention, such as the NMS communication with an SPI-enabled client device, can be performed on already deployed carrier web servers by simply adding SPI-specific syntax into the existing carrier web pages. For example, a real estate company can have a large number of employees using different types of SPI-enabled and network-connected devices (e.g., PDAs, cell phones, digital cameras, etc.). When an employee visits the corporate website, one or more web pages can be SPI-upgraded to send/receive instructions to/from that employee's device. For example, these instructions can automatically, without interrupting a web page being browsed by the employee, perform certain actions, such as uploading or downloading data (e.g., images, documents, etc.), synchronize contacts and appointments, reconfigure device settings (e.g., email access, proxies, virus protection, etc.), automatically launch the company's VPN and so on.

Figure 6:
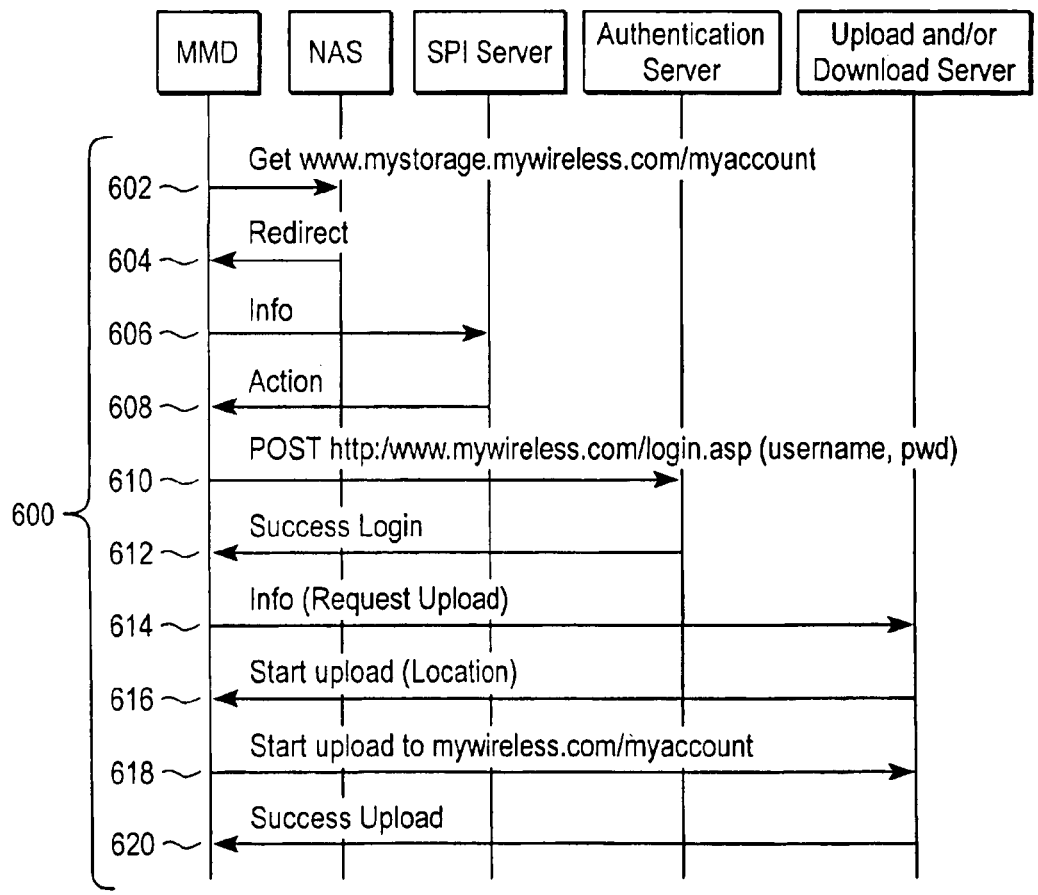
FIG. 6 illustrates a representation of the SPI message exchange sequence between a client and a server according to the present invention.

Referring now to FIG. 6, a representation of an SPI message exchange sequence 600 between a client and a server according to the present invention is shown. The SPI message 600 describes an idealized login scenario for a user who has an already-existing subscription and has successfully logged in at a particular carrier's hotspot and completed the upload successfully. As noted above, the transactions described in this section happen in an automated fashion when the client or MMD arrives at a hotspot hosted by a wireless service provider, the following sequence happens with no or limited user interaction.

At Client Request 602, the user attempts to go to a particular website, for example www.mystorage.mywireless.com/myaccount, using an SPI component embedded in the MMD. At NAS Response 604, the NAS responds with a redirect because the MMD is not authenticated. At Client Request 606, which is the INFO portion of the SPI enable client device communication with the NMS (FIG. 5), the SPI client component embedded in the MMD makes a request to the SPI server with its current INFO. In this example, State=Connected, but not logged in. At SPI Server Response 608, the SPI server responds with an Action message as required by the protocol definition. Because the client device state is not "Logged In," the SPI server sends an Action message to the client, in this case "login" action, which also contains a URL to the authentication server in the form of a parameter name/value pair in the login message. At Client Request 610, the client parses the action message and then responds with a POST request to the authentication server URL providing the user name and password or a single unique device code embedded in the device. At Authentication Server Response 612, the authentication server responds with a successful login message. At 614, the client sends a start upload request. At 616, the server responds with a start upload command sending the upload location URL as a parameter. At 618, the client MMD parses the location URL and begins upload to that location. At 620, the server responds with an affirmative on upload complete.

Although the present invention has been particularly described with reference to embodiments thereof, it should be readily apparent to those of ordinary skill in the art that various changes, modifications and substitutes are intended within the form and details thereof, without departing from the spirit and scope of the invention. Accordingly, it will be appreciated that in numerous instances some features of the invention will be employed without a corresponding use of other features. Further, those skilled in the art will understand that variations can be made in the number and arrangement of components illustrated in the above figures. It is intended that the scope of the appended claims include such changes and modifications.

What is claimed is:

1. A system for automatically connecting devices to a network for management of data transfer between an end-user device enabled with a service provider interface (SPI) protocol and a network operations center (NOC), the system comprising:

a central configuration device for connecting said NOC with said SPI enabled end-user device said central configuration device including a service provider interface (SPI) that provides a client/server communication protocol, wherein the central configuration device is capable of initiating automatic device connectivity including automatic logging on, automatic authentication and seamless, automatic device configuration and automatic data transfer between said central configuration device, at least one SPI server component of said NOC and said SPI enabled end-user device based on user defined parameters using the client/server communication protocol, and wherein said central configuration device stores configuration parameters for client-side automatic authentication, upload and download locations and other related device configurations;

whereby said at least one SPI server component of the NOC includes a storage medium associated therewith that stores the data automatically transferred from said SPI-enabled end-user device and the central communication device provides instructions between said SPI-enabled end-user device and said SPI server component of the NOC to access the data.

2. The system of claim 1, wherein said central configuration device further comprises:

a central configuration server (CCS) for managing the storage and flow of updates and upgrades to clients from a single location;

a service level assurance (SLA) module which sends queries through said SPI and said central configuration server to said SPI-enabled end-user device and said SPI-enabled end-user device which in turn respond to the queries and provides appropriate information regarding location, contact attempts, failures, signal strength, available and effective data rates, and any other status or location information, wherein the information stores in at least one SPI server component of NOC;

a remote management console (RMC) which allows a network administrator to remotely administer the central configuration device; and a selected operating system that communicates with an operating system layer embedded in said central configuration server and which controls said central configuration server, said service level assurance module, and said remote management console.

3. The system of claim 1, wherein said SPI protocol enabled in the end-user device allows a roaming client to communicate to said NOC before and after login into local hotspots.

4. The system of claim 3, wherein when the SPI-enabled end-user device contacts the service level assurance module (SLA), the service level assurance module sends queries through the at least one SPI server component and the central configuration server to the SPI-enabled end-user device for retrieving data upon authentication of the roaming client.

5. The system of claim 3, wherein the SPI-enabled end-user device provides appropriate data to the SLA module based on network policies and parameters for management of network resources.

6. A method of management of data transfer over a wireless network between at least one SPI server component of a network operations center (NOC) and a roaming client residing on an SPI-enabled end-user device, the method comprising the steps of:

automatically initiating a wireless communication session from the roaming client through a central configuration device to access content and information on said at least one SPI server component of the NOC;

redirecting the roaming client to communicate with a local network authentication server (NAS);

allowing said NOC to push back to the client at least one pre-authentication action for the client to execute to verify the client;

providing client identification information to the at least one SPI server component of the NOC after authentication;

allowing the client to execute post-authentication actions; and disconnecting the SPI-enabled end-user device residing by the client and sending final message related to disconnection from the network to said NOC.

7. The method of claim 6 wherein the pre-authentication actions pushed back by the at least one SPI server component of the NOC include one or more of: provisioning a new user, pushing surcharge information to a client, requesting statistics from the client, and prompting a user for a password.

8. The method of claim 6 wherein when the at least one SPI server component of the NOC is not in a service providers network list the pre-authentication actions cannot be executed by both the at least one SPI server component of the NOC and the central configuration device until the roaming client has been authenticated to the network list.

9. The method of claim 8 further comprising the step of:

automatically sending queries through a service provider interface (SPI) and a central configuration server (CCS) to the SPI-enabled end-user device for retrieving data upon authentication of the roaming client by a service level assurance module (SLA) when the SLA module contacts the roaming client.

10. The method of claim 9 further comprising the step of:

providing appropriate data to the SLA module by the client based on network policies and parameters for management of network resources.

11. The method of claim 6 wherein the post-authentication actions executed by the client residing on the SPI-enabled end-user device include one or more of: pushing time remaining, pushing advertising, pushing a custom skin and pushing a message.

12. A method of managing service provider interface message exchange between a SPI-enabled end-user device and at least one SPI (Service Provider Interface) server component of network operations center (NOC), the method comprising the steps of:

(a) attempting to go to a secure website by a user utilizing an SPI component embedded in a multimedia domain (MMD);

(b) redirecting to a local network authentication server (NAS) when the MMD is not authenticated;

(c) providing information from said SPI-enabled end-user device to a central configuration device;

(d) making a request to said at least one SPI server component of the NOC by said SPI client component in the MMD utilizing the provided information;

(e) responding with an action message with login message containing a URL to said authentication server in the form of a parameter name/value pair in the login message by said at least one SPI server component of the NOC;

(f) analyzing the action message and responding with a post request to said authentication server URL by providing the user name and password or a single unique device code embedded in the SPI-enabled end-user device by the SPI-enabled end-user device;

(g) responding with a successful login message by said authentication server;

(h) sending a start upload request by the SPI-enabled end-user device;

(i) responding with a start upload command and sending the upload location URL as a parameter by the SPI-enabled end-user device;

(j) analyzing the location URL and beginning upload to that location by the MMD; and (k) responding with an affirmative on upload complete by said at least one SPI server component of the NOC.

13. The method of claim 12 wherein said service provider interface message renders an idealized login scenario for the client who has an already-existing subscription and has successfully logged in at a particular service provider's hotspot and completed the upload successfully.

* * * * *